United States Patent Office 2,921,803
Patented Jan. 19, 1960

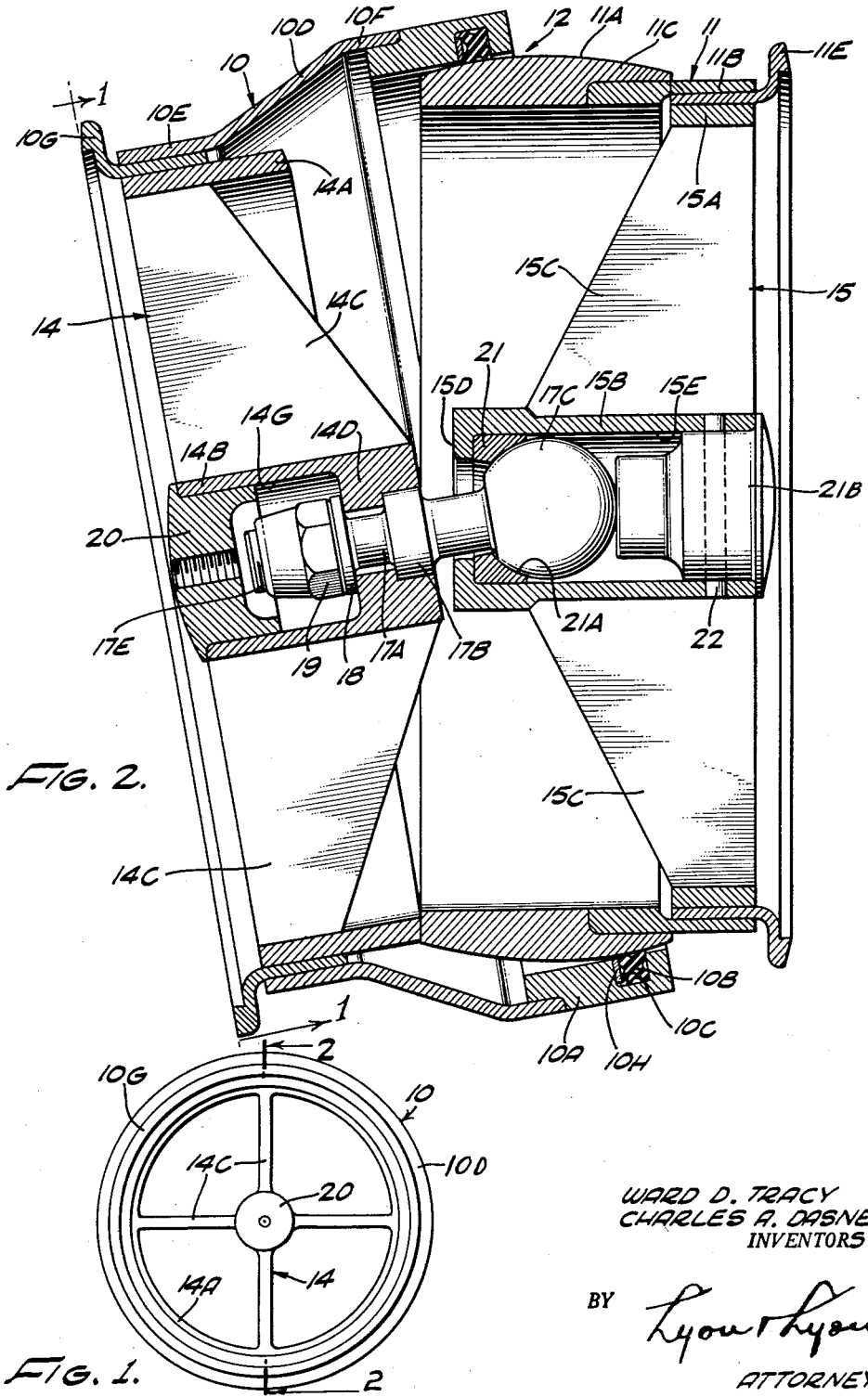

2,921,803

ARTICULATED CONDUIT

Ward D. Tracy, Glendora, and Charles A. Dasney, Arcadia, Calif., assignors to Southwest Products Company, Duarte, Calif., a corporation of California Application January 3, 1956, Serial No. 556,918

1 Claim. (Cl. 285—262)

The present invention relates to improved means and techniques in the construction of ducts or conduits and is particularly useful in those arrangements wherein it is desired to convey gases or fluids of high temperature under high pressure and wherein elements of the arrangement are subjected to relative movement with respect to each other, both in the original installation or during subsequent use.

An object of the present invention is to provide an articulated conduit or duct of the character mentioned above for achieving the above-indicated results.

A specific object of the present invention is to provide an improved duct assembly in which there are two relatively movable parts in which one part may either be rotated with respect to the other part or moved angularly with respect to the same.

Another specific object of the present invention is to provide a duct assembly which includes a pair of articulated members to provide a gas or fluid-tight seal even though the members are subjected to vibration or relative movement with respect to each other, such relative movement being either rotative movement about the axis of the member or angular movement with respect to the axis of the duct, or both rotative and angular movements simultaneously.

Briefly, the arrangement as described herein includes generally a pair of tubular conduits fitted together by a ball and socket type of connection which allows one of the tubular elements to be not only rotated about its axis but also allows the axis of the tubular element to be rotated so that its axis may be either aligned with the axis of the other element or displaced therefrom in the amount of, for example, ten degrees. Means are provided in the assembly for taking care of either tensile forces which tend to hold the ball and socket connection apart or compressive forces which tend to jam or bind elements of the ball and socket connection. These means for taking care of such compressive and tensile forces are disposed in a unique manner inside the conduit itself so as to achieve certain advantages.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings, in which:

Figure 1 is a view in end elevation of a duct assembly embodying features of the present invention with the duct elements aligned, a different view being taken in the direction indicated by the arrows 1—1 in Figure 2.

Figure 2 is a transverse sectional view taken as indicated by the line 2—2 in Figure 1, but with the cooperating duct elements moved out of alignment.

The assembly shown herein provides a gas or fluid-tight joint or connection and involves generally a pair of tubular conduits 10 and 11 fitted together by a ball and socket type of connection 12 which allows the tubular element 11 to be not only rotated about its own axis but also allows the axis of the tubular element 11 to be moved so that its axis may be inclined in the amount of, for example, ten degrees with respect to the axis of the other tubular element 10.

Figure 1 shows a four-legged spider 14 near the mouth of the tubular element 10, and a similar four-legged spider construction 15 is near the mouth of the other element 10 for imparting strength and dimensional stability to the assembly and for other purposes described later, since such assembly is used to conduct gases of very high temperatures at very high pressures.

The sliding fit in the ball and socket connection 12 is provided by the quad ring sealing ring 10B, recessed in the cylindrical portion 10A of the conduit 10 and the cooperating convex annular surface 11A of the conduit 11. This sealing ring 10B which is recessed in the annular groove 10C is a ring-shaped element of silicon rubber which is referred to in the art as a quad ring. This ring 10B abuts the surface 11A to provide the sole means for providing a seal between the conduits 10 and 11.

As shown in the drawings, the conduit 10 is an assemblage of parts which are joined together, as for example by welding, brazing and the like, to form a composite integral structure. These parts include a tubular element 10D formed to provide an outer flanged portion 10E of relatively small diameter and an inner flanged portion 10F of relatively large diameter. The cylindrical portion 10A which has the recessed sealing ring 10B is suitably joined to the inner flanged portion 10F. The outer flanged portion 10E has suitably joined thereto a conventional coupling element 10G and the aforementioned spider 14.

The other tubular conduit 11 comprises an assembly of parts. These parts include generally a tubular element 11B having an external shoulder portion and an internal shoulder portion. The annular convex bearing member 11C which has the aforementioned bearing surface 11A is suitably mounted and joined to the outer portion of the tubular element 11B in abutting relation to the external shoulder of sleeve 11B; and a suitable conventional ring-shaped fitting 11E and the aforementioned spider 15 are suitably joined to the internal surface of the tubular element 11B in abutting relation to the internal shoulder thereof.

Each of the spiders 14 and 15 is of identical construction and comprises an outer annular ring 14A, 15A, joined to an internal hollow hub portion 14B, 15B by four radially extending arms or legs 14C, 15C, respectively.

The hub 14B is provided with a centrally apertured wall 14D through which the shank 17A of the bearing ball 17C extends for fastening thereto. This shank 17A has integrally formed thereon the annular flange 17B which is snugly received in the end of the hub member 14B so as to contact one side of the wall 14D, the other side of the wall 14C being engaged by the washer 18 which is pressed against such wall by the nut 19, threaded on the threaded portion 17E of the shank. Preferably, the outer end of the recessed portion 14G of the hub is closed by movable plug 20 to impart a greater degree of dimensional stability to the assembly.

It is noted that the outer hub 15B is generally cylindrical and is partially closed at the inner end by a centrally apertured wall 15D through which the shank 17A of the bearing ball 17C extends. This wall 15D retains an annular bearing member 21 which has a spherical bearing surface 21A of diameter substantially equal to the diameter of the ball 17C so as to provide a good sliding fit with the same. The hollow interior portion 15E of the hub has preferably inserted therein a removable plug 21B to improve the degree of dimensional stability of the assembly. This plug 21B is retained in the hub 15B by a removable pin 22 which cooperates with the apertured portions in the hub and the aligned apertured portion in the plug 21B.

It is noted that tensile forces, i.e. those forces which tend to pull the conduit elements 10 and 11 apart, are taken care of by the ball 17C engaging the bearing member 21. The compressive forces, i.e., those forces which tend to move the elements 10 and 11 together, are accommodated by the shank flange 17B contacting the hub wall 14D and also by the ball 17C engaging the inner end of the plug 21B. Preferably, as shown in Figure 2, the quad ring 10B contacts an annular metallic ring 10H which is also retained in the recessed portion 10C.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

We claim:

A duct assembly, comprising: a first tubular element having an inner cylindrical surface of uniform diameter at one end, said inner cylindrical surface having an annular recess formed therein, gasket means retained in said annular recess, a second tubular element having an annular convex bearing surface extending within said one end of the first tubular element, said convex bearing surface most closely approaching said inner cylindrical surface at said annular recess, and said gasket means abutting said convex bearing surface to form the sole seal between said tubular elements, a first spider mounted in said first tubular element and having a first annular hollow hub portion, a second spider mounted in said second tubular element and having a second annular hollow hub portion, said first and second hub portions each having respectively a first and a second apertured wall, said first apertured walls being disposed in opposed adjacent relationship, an annular bearing member retained by the second wall of the second hub and having a generally spherical bearing surface, a spherical bearing ball disposed in said second hub in contact with said bearing surface, said bearing ball having a shank extending through said first and second walls of both said hub portions, said shank having an annular flange engaging the first wall of said first hub portion, means on the end of the shank engaging the second wall of said first hub portion for clamping said flange to said first wall of said first hub portion, said ball cooperating with said bearing surface to accommodate tensile forces, a plug mounted in and completely filling the outer end of said second hub and having a reduced end portion contacting said ball with substantially point contact to hold said ball against said bearing surface and to accommodate compressive forces, with the contacting surfaces of the ball and plug being such that the plug may slide on and with respect to said ball in all relative positions of said inner and outer tubular elements, and a second plug mounted in and completely filling the outer end of said first hub.

References Cited in the file of this patent

UNITED STATES PATENTS

| | | |
|---|---|---|
| 781,862 | Allen | Feb. 7, 1905 |
| 866,061 | Phillips | Sept. 17, 1907 |
| 979,513 | Koenig | Dec. 27, 1910 |
| 997,376 | Diehl | July 11, 1911 |
| 1,007,362 | Koenig | Oct. 31, 1911 |
| 1,452,530 | Sherbondy | Aug. 24, 1923 |
| 1,674,130 | Russell | June 19, 1928 |
| 2,465,373 | Hall | Mar. 29, 1949 |
| 2,516,743 | Allin | July 25, 1950 |
| 2,606,051 | Thorn | Aug. 5, 1952 |
| 2,813,731 | Tracy | Nov. 19, 1957 |
| 2,824,758 | Cattrell | Feb. 25, 1958 |